(12) United States Patent
Zemel et al.

(10) Patent No.: US 7,226,542 B2
(45) Date of Patent: Jun. 5, 2007

(54) FLUID TREATMENT APPARATUS

(75) Inventors: Marc I. Zemel, West Harrison, NY (US); Leszek Wojcik, Poughquag, NY (US); Shyam Raghunandan, Ossining, NY (US)

(73) Assignee: Anvik Corporation, Hawthorne, NY (US)

( * ) Notice: Subject to any disclaimer, the term of this patent is extended or adjusted under 35 U.S.C. 154(b) by 432 days.

(21) Appl. No.: 10/646,960

(22) Filed: Aug. 22, 2003

(65) Prior Publication Data

US 2005/0183996 A1 Aug. 25, 2005

(51) Int. Cl.
*C02F 1/32* (2006.01)

(52) U.S. Cl. .................. 210/748; 210/94; 210/192; 210/259; 250/435; 250/436; 250/437; 422/186.3

(58) Field of Classification Search .............. 210/94, 210/192, 259, 748; 250/435, 436, 437; 422/186.3
See application file for complete search history.

(56) References Cited

U.S. PATENT DOCUMENTS

| | | | | |
|---|---|---|---|---|
| 4,694,179 A | * | 9/1987 | Lew et al. .................. 250/431 |
| 4,816,149 A | * | 3/1989 | Wekell .................... 210/257.2 |
| 5,626,768 A | * | 5/1997 | Ressler et al. .............. 210/748 |
| 6,042,720 A | * | 3/2000 | Reber et al. ................ 210/85 |
| 6,579,803 B2 | * | 6/2003 | Geusic et al. .............. 438/706 |
| 6,695,664 B2 | * | 2/2004 | Eden et al. ................. 445/24 |
| 2004/0144733 A1 | * | 7/2004 | Cooper et al. .............. 210/748 |
| 2004/0238344 A1 | * | 12/2004 | Benoit et al. ............ 204/157.3 |
| 2005/0000913 A1 | * | 1/2005 | Betterly .................... 210/748 |

* cited by examiner

*Primary Examiner*—Krishnan S Menon
*Assistant Examiner*—Benjamin Kurtz
(74) *Attorney, Agent, or Firm*—Carl C. Kling

(57) ABSTRACT

Portable personal water purifier with a microdischarge array sealed with a radiation emitter, preferably Xel, slightly above atmospheric or water pressure in a closely-configured treatment chamber. Each array is a polyimide film separating a copper layer or mesh cathode surface from a conductor pattern of nickel anodes at UV pixel via sites, juxtaposed in effective purifying range of all the water. In a canteen embodiment, the array is presented as a divider in the water chamber, or at its sides. In a continuous-flow embodiment, the array is presented as a spiral flow-through packet between input and output connections axial to a cylindrical water jacket. Battery or plug power is provided, along with any desired input filter. Two microdischarge arrays are preferably sealed in a twin-pack about a set of stiffener rods, extending outward for re-assembly in sockets after cleaning. Other separation assurance devices are spiral and chain separators.

2 Claims, 3 Drawing Sheets

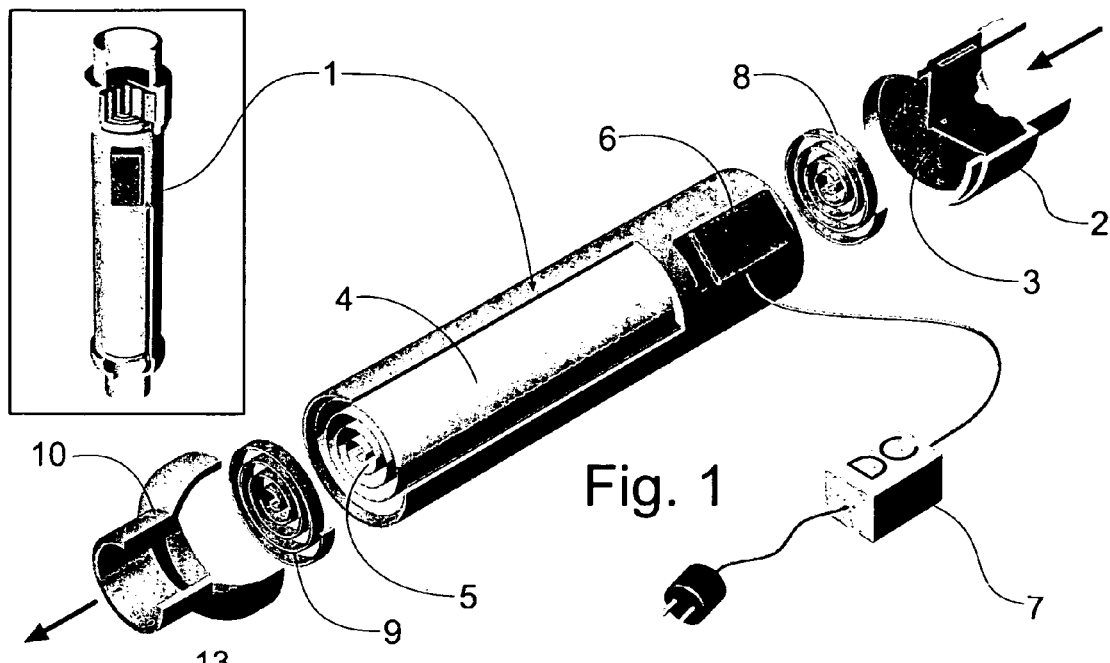
Fig. 1
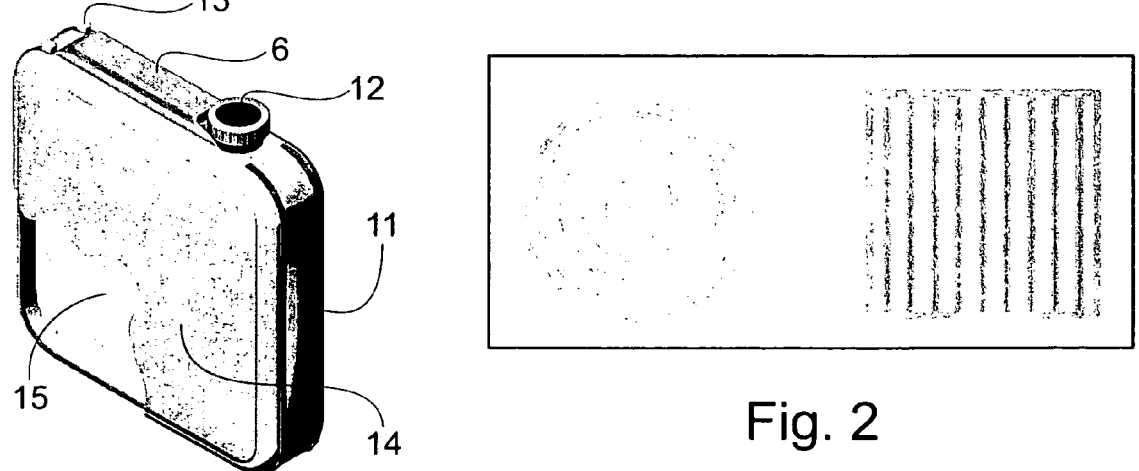
Fig. 2
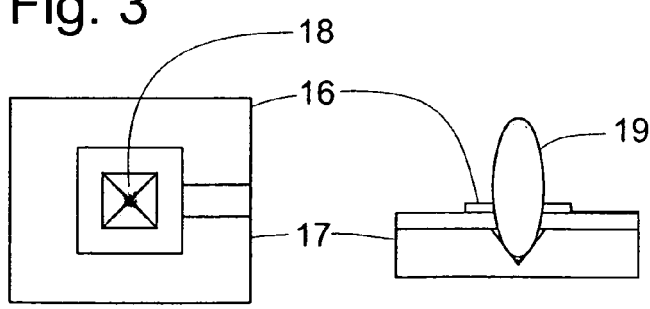
Fig. 3
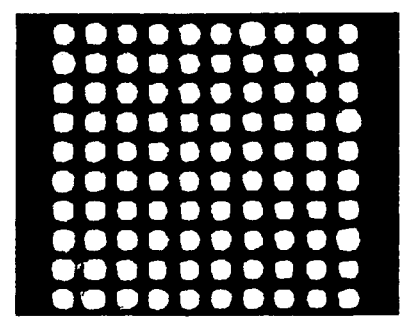
Fig. 4 PRIOR ART
Fig. 5 PRIOR ART

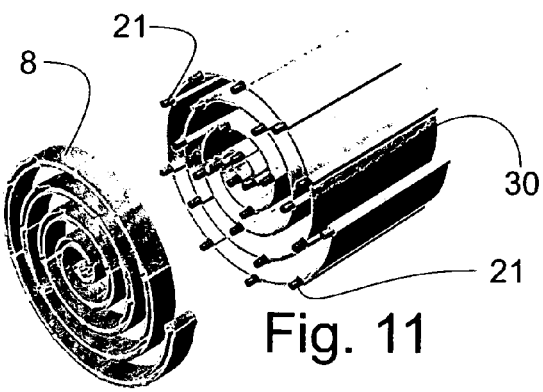
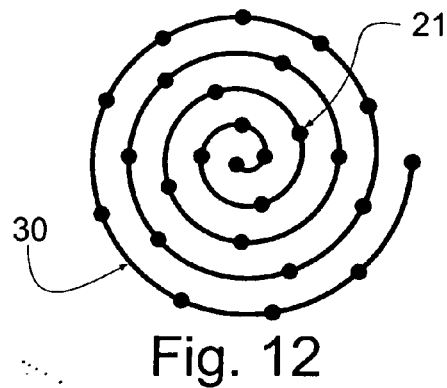
Fig. 8  Fig. 11  Fig. 12
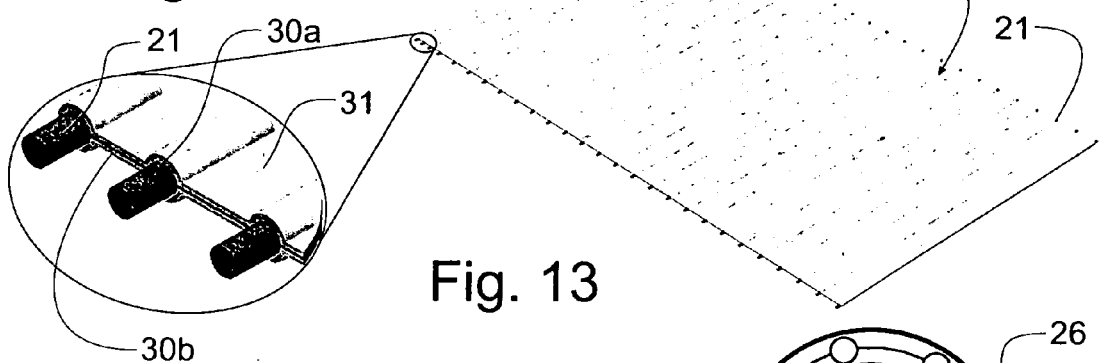
Fig. 13
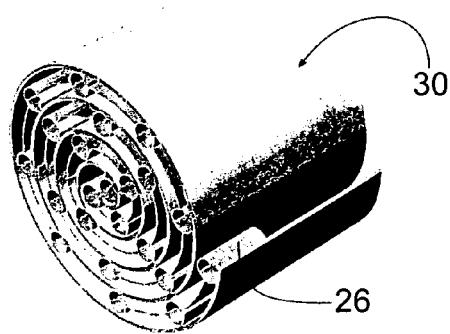
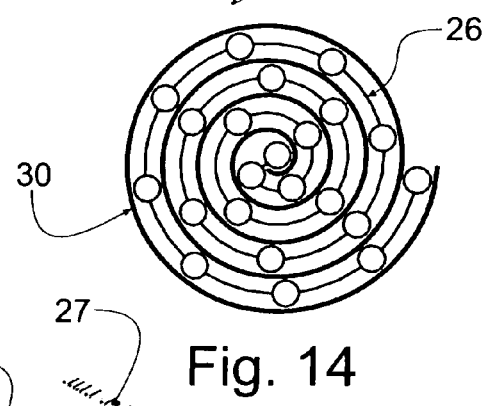
Fig. 15  Fig. 14
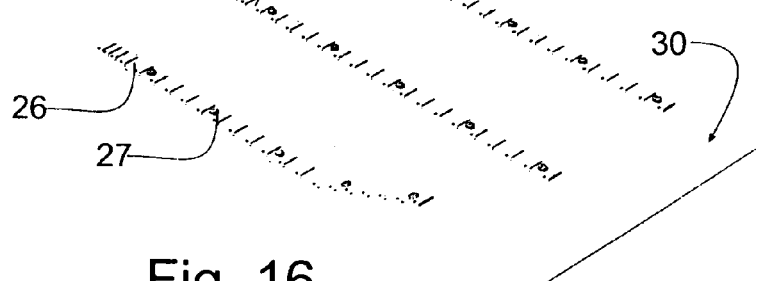
Fig. 16

FLUID TREATMENT APPARATUS

BACKGROUND OF THE INVENTION (1) Field of the Invention

This invention relates to apparatus for treating fluids with radiation, and particularly relates to a portable personal water purification system.

(2) Description of Related Art

A portable water purification system that can rapidly eliminate microbiological contaminants from suspect water sources is attractive for both military and commercial sectors. Such a system enables soldiers, outdoorsmen, and other persons who lack access to clean water to reduce or eliminate the need to transport water for the trip. The requirements for such a system include: low cost, light weight, low power consumption, ruggedness, high water flow rate, durability, and, of course, ability to produce water meeting drinking standards such as the Tri-service standard described in TB Med 577. Current water purification technologies suffer from limitations that have impeded their implementation in a low-cost, portable configuration. We address key barriers to the development of such a portable water purification system through the use of a novel, low-power, flexible ultraviolet (UV) light source for rapid disinfection of microbiological contaminants including bacteria, protozoan cysts, and viruses.

Many technologies for water purification have been developed, including mechanical filtration, distillation, reverse osmosis, UV disinfection, chlorination, and ozonation. Each of these technologies suffers from major limitations that have diminished their adoption for portable water purification. In many cases, the technologies effective to meet the requirements in some areas outlined above are severely limited for meeting other requirements. For example, reverse osmosis (RO), is very effective at removal of pathogens in water, is light weight and requires no power consumption. However, reverse osmosis is an extremely slow process, can be costly, and is not rugged in that its effectiveness can be compromised by membrane rupture.

We present a novel, low-power, water purification system that incorporates a flexible microdischarge array as a source for UV disinfection. Such arrays are attractive as a large-area flexible sheet UV light source for germicidal applications due to their ruggedness, conformability, low manufacturing cost, and efficiency. In addition, they can be tailored to deliver the exact spectrum required for disinfection (200-300 nm with a peak at 254 nm) and can operate using nontoxic alternatives to mercury, such as XeI. We integrate the flexible microdischarge array into a water purification system that will enable removal of bacteria to 6 logs, protozoan cysts to 3 logs, and viruses to 4 logs. The disinfection system is lightweight (<18 oz.), performs at high speed (>1 liter/min), and produces at least 150 liters of potable water prior to maintenance. Finally, we incorporate mechanical prefilters to assist in removal of turbidity and toxic contaminants.

BACKGROUND

Current Water Purification Approaches

Methods for water purification are life-sustaining technologies, and as a result there is much research and many different approaches to meet this critical need. Technologies for water purification include mechanical filtration, reverse osmosis, distillation, UV disinfection, chlorination, and ozonation. Each of these technologies suffers from major limitations that have precluded their adoption for portable water purification. In many cases, the technologies can meet some requirements outlined above, but are severely limited for meeting other requirements, especially portability.

a. Mechanical Filtration

Mechanical or particulate filters consist of compacted cartridges, felt, cloth, woven fiber or other media with arrays of pores having sizes on the order of microns. They vary widely in cost and performance, but for the most part, they are inexpensive, easy to install, and offer good flow rates. They are not effective against many waterborne microorganisms, at least to the levels required by TB Med 577. A common filter type is granular activated carbon (GAC), which is often employed in point-of-use (POU) units for residential and commercial applications. However, GAC filters can also serve as an incubator of bacteria because of their porous structure and nutrient-rich environment. Generally, particulate filters are best-suited for "pre-filters" to remove sediment and gross levels of contamination in order to reduce the demands placed on higher-performance filtration components.

b. Reverse Osmosis

Reverse osmosis (RO), is a form of filtration in which pressure is used, in addition to a difference in concentration across a membrane, to cause flow through a membrane, where the pressure causes a flow that is opposite the natural osmotic flow. Effectively the osmotic pressure causes dilution, while reverse osmosis causes separation and concentration. RO units commonly use thin-film composite membranes such as those made from cellulose acetate or polyamide because of their efficiency. They are very effective at removal of pathogens in water, are light weight and require no power consumption. However, reverse osmosis is an extremely slow process, it can be costly, and it is not rugged in that its effectiveness can be compromised by membrane rupture. In fact, some chemicals, such as chlorine, can damage the membranes. Finally, it is difficult to monitor the effectiveness of the process due to the difficulty in detecting holes in the membrane.

c. Chlorination and Ozonation

Chlorinators add chlorine to water stored in a tank, and by allowing sufficient contact time, ensures that harmful microbes will be killed. Ozone can also be used in a similar fashion to kill microbes. Chlorine is effective against most bacteria and viruses, but not Cryptosporidium. Both techniques require the handling of chemicals and present maintenance issues. Further, these techniques can generate disinfection by-products (DBPs) that can potentially cause cancer, such as trihalomethanes and haloacetic acids.

d. Distillation

Distillation is known as one of the most effective technologies for production of contaminant-free water. It involves the simple boiling of the water and collection of the steam for condensation into pure water, leaving the contaminants behind in the boiling chamber. Unfortunately, such a system is not compact, light weight, cost-effective nor power efficient enough to be implemented in a portable water purification system.

e. Conventional UV Disinfection

Ultraviolet radiation causes germicide as a result of photochemical damage to DNA and RNA that prevent reproduction of the organism. The rate of photochemical damage is directly proportional to the power delivered to the microbes. That is, a burst of high-intensity, short-duration radiation will be equivalent in effectiveness to a longer dose of lower-intensity radiation. It has been shown to be effective against bacteria, viruses, and protozoa. It does not use chemicals, it can be performed at high flow rates, and is easy to maintain.

Yet, there are some problems with UV disinfection systems that have prevented their implementation in personal portable purification units. It is well-known that the transmission and effectiveness of UV illumination of water for disinfection drops off dramatically at a distance as low as 1 inch. Consequently, several companies who market mercury-arc-lamp-based disinfection systems have developed elaborate mixing methods and fluid models based on computational fluid dynamics (CFD) to improve the disinfection effectiveness by ensuring that all of the water passes close enough to the mercury arc lamp. Such mixing systems consume extra power, which is critical to portable systems. Additionally, the lamp housing tends to "foul" with time, depending primarily upon the quality of the pre-filtration. Finally, the mercury bulb does require constant maintenance and attention to track the effectiveness (as a result of the fouling) and is not rugged; it can be prone to catastrophic explosion and release of toxic mercury into the water supply.

Limitations of Current Water Purification Techniques

Limitations of the current existing water purification techniques include:

(1) Mechanical filters are not effective against many waterborne microorganisms, at least not to the levels required by TB Med 577.

(2) Reverse Osmosis is an extremely slow process, it can be costly, and it is not rugged in that its effectiveness can be compromised by membrane rupture.

(3) Chlorine and ozone require the handling of chemicals and can be prone to maintenance issues. Further, these techniques can generate carcinogenic disinfection by-products (DBPs).

(4) Distillation systems are not compact, light weight, cost-effective nor power efficient enough to be implemented in a portable water purification system.

(5) Conventional UV disinfection is effective against bacteria, viruses, and protozoa and can be performed at high flow rates. However, the mercury arc lamp housing tends to "foul" with time, it requires constant maintenance and attention to track the effectiveness (as a result of the fouling) and is not rugged; it can be prone to catastrophic explosion and release of toxic mercury into the water supply.

(6) The effectiveness of UV illumination of water for disinfection also drops off dramatically at a distance as low as 1 inch. Mixing systems that have been developed to ensure that all the water passes close enough to the mercury arc lamp consume extra power, which is critical to portable systems.

From the above list, it is clear that each of the existing water purification technologies suffer severe limitations. The best current portable water purification systems generally use a combination of different technologies in order to maximize their effectiveness while compensating for any remaining limitations.

BRIEF SUMMARY OF THE INVENTION

This invention combines economy and convenience in providing portable personal purified potable water through use of a sealed microdischarge array with filter and power source.

An object of this invention is to enable an individual, such as a soldier or a hiker, to carry a personal water purification system.

Another Object is to Provide Drinking Water Purification at Very Low Cost

A feature of the invention is a durable, inexpensive, lightweight microdischarge array sealed inside a water jacket in such proximity that all the water is subjected to purifying radiation.

Another feature of the invention is a double seal for paired microdischarge arrays, each sealed in its own atmosphere of radiation discharge material, with the twin package being easily removable from its water jacket and equipped with stiffeners for easy re-assembly after cleaning.

An advantage of the invention is that it is inexpensive, safe, lightweight and durable.

Another advantage is that the invention is subject to easy cleaning and repair.

While the invention has been shown and described in a personal water purification embodiment, it should be apparent to those skilled in the art that treatment of other fluids is also possible, and that various changes in form and detail may be made without departing from the spirit and scope of the invention, as shown in the following drawings:

BRIEF DESCRIPTION OF THE SEVERAL VIEWS OF THE DRAWING

FIG. 1 is a partially cutaway, exploded view of an in-line embodiment of the personal portable water purifier of the invention, with a similarly cutaway fully assembled unit in the inset.

FIG. 2 is an end-on schematic view of a helically-wound microdischarge array and of a parallel-plate microdischarge array.

FIG. 3 is a partially cutaway view of a canteen embodiment of the personal portable water purifier of the invention.

FIG. 4 is a top view and inset cross-sectional view of a microdischarge pixel site, illustrating operation of a single pixel site, representative of prior art.

FIG. 5 is a photomicrograph of a 10×10 portion of a microdischarge array representative of prior art.

FIG. 8 is showing of spiral 8.

FIG. 11 is a selection of separation assurance means, including extending stiffener rods, shown juxtaposed with spiral 8 of FIG. 8.

FIG. 12 is a section of a double-sealed twin microdischarge array unit with stiffener rods.

FIG. 13 is a section of a double-sealed twin microdischarge array unit with extending stiffener rods, shown with an inset for detail of how two sealed microdischarge arrays 30*a* and 30*b* are laminated over stiffener rods 21*a*-21*b*.

FIG. 14 is a depiction of a specially-configured double-sealed microdischarge array unit with selected stiffener rods sealed inside.

FIG. 15 is an end view showing separation assurance chain.

FIG. 16 shows attachment of a separation assurance chain to a sealed microdischarge array.

SUMMARY OF THE INVENTION

Figure 6:
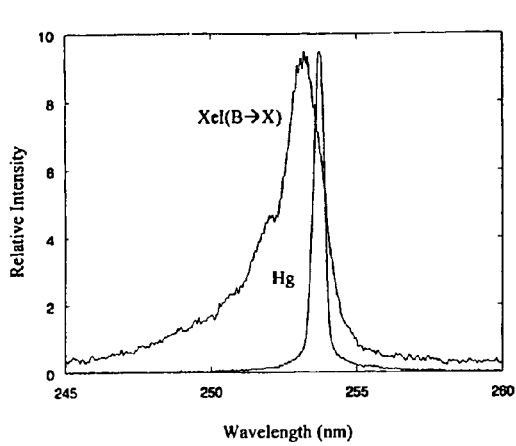
FIG. 6 is a composite graph, known to prior art, showing relative intensities of Xel (B–>x) fluorescence and Hg resonance line at 253.7 nm produced by a low-pressure capillary discharge lamp.

The invention is a portable water purification system using a low-power, flexible ultraviolet (UV) radiation source for rapid disinfection of microbiological contaminants including bacteria, protozoan cysts and viruses. This system enables removal of bacteria to 6 logs, protozoan cysts to 3 logs, and viruses to 4 logs. It is lightweight (<18 oz.), performs at high flow rates (>1 liter/min), and produces at least 150 liters of potable water prior to requiring maintenance. Finally, it incorporates a mechanical prefilter to assist in removal of turbidity and toxic contaminants.

The Portable, UV-Microdischarge-Based Water Purification System

We have developed two configurations of personal, portable, UV-based water purification systems, the in-line system and the canteen system. The first, as shown in FIG. 1, is a stand-alone in-line water purification system 1 designed to attach to a variety of storage vessels, pipes or faucets. It consists of the following modules:

an input funnel or reservoir 2, a carbon pre-filter cartridge 3 (minimum pore size 3 to 5 microns or less), a flexible sheet UV light source 4 in a sealed microdischarge array 5, and a battery pack 6.

It can also be configured with a pressure control device to mount to the output of a water pump (that delivers the water prior to purification) and operate using an AC adapter 7.

The carbon pre-filter cartridge 3 serves to reduce particulate matter and toxic compounds (reduce turbidity), which will also ensure that the effectiveness of the UV-based disinfection is maintained since these materials tend to reduce the transmission of ultraviolet light in water. The pre-filter cartridge resides in a plastic housing which provides a central mounting support or attachment to the input reservoir or funnel, the battery pack, and the sealed microdischarge array 5 which is popularly referred to as Flexible Ultraviolet Microdischarge Purifier (FUMP).

The operating principle of the FUMP 5, specifically, the sealed UV-microdischarge array 5 with its enclosed flexible sheet UV light source 4 and its radiation-producing atmosphere, is described in detail in the next Section. The FUMP is configured to deliver disinfection while enabling high water flow rates and easy cleaning.

FIG. 2 shows two configurations for the interior of the FUMP. Either the spiral shape or the parallel plate configuration limits the maximum distance between any portion of the water and a microdischarge UV emitter to 5-10 mm, and effective radiation travel in water. In doing so, it ensures that the UV transmission, and consequently, maximum disinfection, is maintained throughout the volume of water. In addition, these two configurations are designed for easy disassembly and cleaning to remove any fouling that may accumulate on the FUMP (over time). For example, the spiral-mounted FUMP is simply unrolled and wiped down and then easily re-wound into the spiral configuration. Spacing assurance for the FUMP is provided by plastic spiral 8, holding the carbon pre-filter cartridge 3 in place and separating the layers, or spiral 9 at the other end of the FUMP 4 enclosed by end cap 10. Other spacing assurance means will be discussed later. Finally, the length of the FUMP is tailored to ensure that the water receives enough UV radiation, as it flows, to complete the disinfection. This length of the FUMP will be comparable to the length of conventional low-pressure mercury arc lamps. Most of these parts will have analogues in other embodiments, as sizes change or as optimization for additional environments are selected.

FIG. 3 shows the second embodiment of the portable, UV-based water purification system, the large canteen 11. This configuration is designed to take full advantage of the flexibility of the FUMP. As shown, it incorporates the microdischarge array 5 along the interior of a five-quart collapsible water carrier, which is a standard size issued to field soldiers. Once emptied, the water carrier can be rolled to pocket size. Additionally, this design has the advantage of enabling the filling process (and speed) to be decoupled from purification. That is, the water carrier can be filled at very high speed, and purification can be performed at any time (prior to drinking). For example, in time-critical situations, soldiers could simply fill their canteens as quickly as possible without restriction on flow rates for purification purposes. For safety, the design incorporates an indicator cap 12 to confirm that the water has been purified prior to drinking. Such an indicator can be used to track the time to clean the unit or replace the filter cartridge.

Operation is much the same as in the in-line unit. Water of unknown purity is filtered and passed along the radiation emitting surface of the FUMP, from an input position to a potable storage and output portion. Dimensions are kept within limits so the radiation can penetrate the water as it passes. Battery pack 6 operates similarly the battery pack 6 in FIG. 1. Zippers 13 allow access within outer cover 14 to inner container 15.

Flexible Microdischarge Arrays for UV Disinfection

In this section, we describe the principle of operation of the UV microdischarge emitter in more detail. Microdischarge devices represent a new family of photonic emitters and detectors in which a weakly-ionized plasma is confined to spatial dimensions, typically <200 μm. Microdischarge devices and arrays fabricated (to date) in silicon, ceramics, and metavpolymer structures by processes largely developed by the semiconductor and MEMS communities exhibit several unique and attractive properties. These properties include the ability to operate continuously at atmospheric pressures with specific power loadings of the plasma of several tens of kW-cm$^{-3}$. In addition, radiation in a wide variety of wavelengths, from the extreme ultraviolet (EUV) to the far infrared can be produced.

FIGS. 4 and 5 show a schematic diagram and photomicrograph of a simple prior art microdischarge device fabricated in silicon. In its most basic form, a single device consists of an anode 16, (generally a metal film), one or more dielectric films 17, and a cathode 18. In the case of silicon, the cathode microcavity can assume one of several shapes such as the inverted square pyramids of FIG. 4 that are produced by wet chemical etching. With proper voltages applied, and in a proper plasma-radiation-producing atmosphere, radiation is produced in area 19.

These devices have been characterized extensively in the rare gases and FIG. 5 is a photograph of a 10×10 array of (50

μm)² silicon devices operating in 1200 Torr (>1.5 atm!) of Ne. Microdischarge devices have also been characterized and operated in ceramic multilayer structures and metal/polymer/metal sandwiches. Devices as small as 100 μm² in cross-sectional area have been successfully demonstrated to date. The largest arrays realized thus far, four 15×15 arrays for a total of 900 pixels, have been fabricated on a silicon chip <10 mm² in size and applied to the photoexcitation of a phosphor. Throughout this work, another clear characteristic of microdischarge devices has emerged—namely, they prefer to operate in the abnormal glow (positive differential resistance regime) but their operating electrical (V-I) characteristics can be altered at will by the design of the microcavity. This is an enormous asset in tailoring microdischarges for a specific application.

We use a flexible sheet radiation source to compete with illumination from conventional mercury lamps. Such arrays are attractive as a large-area flexible sheet UV light source for germicidal applications due to their ruggedness, conformability, low manufacturing cost, and electrical efficiency. Previously, we have investigated the use of the excimer emission from the XeI band (253.2 nm), which is close to the resonant line radiation of Hg (253.7 nm) [6]. In this case, cylindrical channels 400 μm in diameter were machined ultrasonically in silicon to form the discharge cathode and a Cr/Ni film served as the anode. The purities of the Xe and $I_2$ gases were research grade and 99.99%, respectively. As shown in FIG. 6, the relative intensities of the Hg lamp emission and the emission from a microdischarge cavity using XeI gas are quite comparable. The results from this experiment and others suggest that a XeI lamp would be interchangeable with a low pressure Hg UV source for equivalent fluid treatment.

There are additional benefits to the use of the microdischarge over the mercury arc lamp. Much of the radiation emitted by conventional mercury arc lamps is not ultraviolet light. By comparison, the microdischarge arrays can be tailored to emit only UV radiation in the disinfection range (200-300 nm). Further, the use of XeI represents a nontoxic alternative to mercury arc lamps. Finally, mercury arc lamps can explode catastrophically, releasing toxic mercury into the water, whereas the failure mode of the microdischarge is simply loss of illumination.

Fabrication of Flexible Microdischarge Arrays

Figure 7:
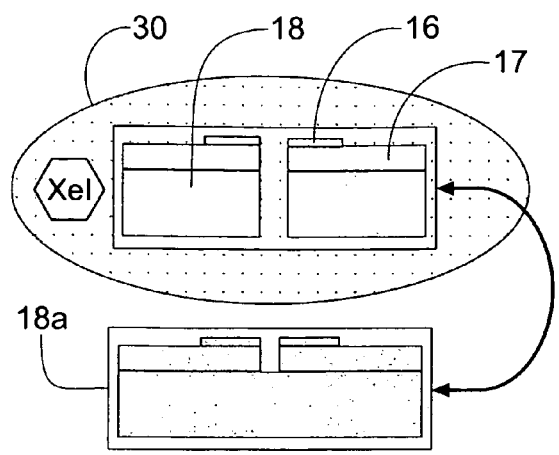
FIG. 7 is a cross-sectional schematic view of a microdischarge pixel cavity of total thickness approximately 30 µm. The inset is a screen electrode in place of the cathode sheet.

FIG. 7 shows how these devices consist of a nickel film anode 16 on a polyimide dielectric 17 with a copper film cathode (copper layer 18 or screen 18a), to form a glow 19 (see FIG. 4) in the plasma atmosphere. Previously fabricated microdischarge devices in metal/polymer/metal-layered structures have been operated at rare gas pressures up to 1200 torr of neon. Cylindrical microcavities were then mechanically drilled into the film. Having a total thickness of 30 μm, these devices are well suited for flexible arrays.

These microdischarge arrays can be seated through conventional lamination. Operating voltages as low as 114 V were observed at 700 torr of Ne and device lifetimes were in excess of 50 hours. It has been determined that the microdiseharge arrays can be refilled with new gas at the end of their useful life and then deliver the same performance. Thus, the primary limiting factor in the lifetime of the arrays is the outgassing of the barrier materials.

A large-area, high-density microdischarge array on a flexible substrate, if it is to perform as a flexible sheet light source, must have the array fabricated in larger areas and at higher densities so that the pixel sites will deliver uniform illumination. In addition, proper materials must be selected and electrode configurations designed in order to maximize the brightness and lifetime of the microdischarges while minimizing power consumption. Selection of materials and vacuum lamination technology to limit outgassing will help increase lifetimes.

Dramatic improvements in device performance have also been observed when the cathode 18 is in the form of a screen electrode 18a. Such a screen electrode may be fabricated as an integral part of the microdischarge array (with proper alignment).

Figure 9:
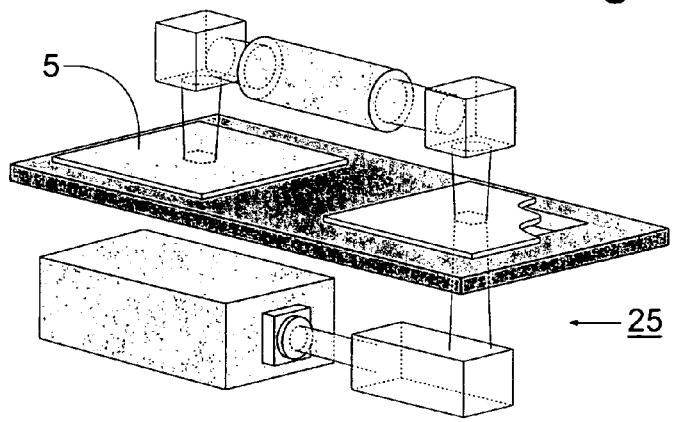
FIG. 9 is a schematic depiction of a pattern exposure system (prior art) for providing the microdischarge array.
Figure 10:
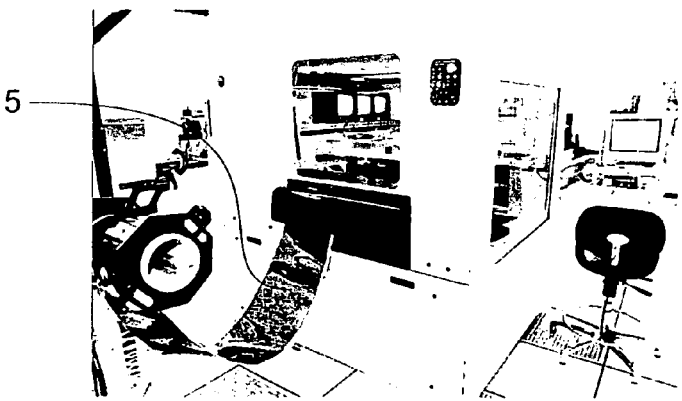
FIG. 10 is a preferred high production system (prior art) showing high-speed patterning of microdischarge arrays.

FIGS. 9 and 10 present a picture of a recent prior-art large-area projection lithography system 25 for patterning on roll-fed materials. The flexible substrate is fed from the supply roller, extends across the exposure region on the scanning stage, and is wound onto the take-up roller. During exposure, the segment (panel) of the flexible substrate being exposed is held rigidly on the scanning stage by vacuum. The illumination system produces a hexagonal illumination region on the mask which is imaged by the projection lens on to the substrate, and the stage causes the substrate and mask to scan synchronously. The longitudinal scans are along the x-axis, and overlap seamlessly with each other. Following each x-scan, the stage moves along the y-axis by the effective scan width, after which another x-scan is generated in the opposite direction, and so on. After the exposure of a segment is complete, the vacuum grip is released and the flexible substrate is advanced to expose the next segment of the roll material.

The same single planar stage and seamless scanning technology is employed in order to perform large-area ablation. For ablation, the energy intensity (fluence) of the beam is increased by increasing the laser power and/or reducing the hexagon size such that the intensity is above the ablation threshold of the material. The hexagon size is designed to maximize the throughput of the system given the etch rate of the material, which is a function of the fluence. For example, the etch rate of polyimide is approximately 0.6 microns/J/cm2. Given the available laser power, the fluence delivered (and consequently, the etch depth) by a large hexagon will be lower than the fluence delivered by a small hexagon. On the other hand, the number of scans required to cover an entire substrate is inversely proportional to the size of the hexagon. Note that the ablation rate for polymers is very controllable owing to the well-defined etch rates. Further, a material with a substantially higher ablation threshold, such as Cu, can be used as an etch stop.

Separation Assurance

FIGS. 11-13 show diagrammatically how separation of adjacent layers of sealed microdischarge array is required for effective fluid flow of the selected fluid, usually water having suspected pollution. Separation must be limited to approximately 2.5 centimeters for effective radiation disinfect capability. Accordingly, it is preferred to group together two sealed microdischarge arrays, as shown in the inset to FIG. 13, and to seal together those two grouped sealed microdischarge arrays about a set of stiffener rods 21 as shown. One reason for sealing the two sealed microdischarge arrays together is to permit them to be individually made and tested before being cemented or otherwise sealed about the set of stiffener rods. Another reason is that the two sealed microdischarge arrays thus may be taken out of the water chamber as a unit for cleaning, requiring only a simple wiping operation on the outside surface of each, and then the double-sealed, stiffener rod reinforced, twin microdischarge array unit may be re-rolled for return to the water chamber for use. Representative stiffener rods 21 are not in contact with the water in the active radiation area, and thus are largely exempt from fouling. In case of damage in the field, the throwaway unit during field operations may be the double-sealed twin sealed microdischarge array unit 30, with integral stiffeners 21, shown in FIG. 13. Under more normal circumstances, however, the double-sealed twin microdischarge array 30, with integral stiffeners 21, may be repaired or remanufactured, usually by taking the damaged sealed microdischarge array away, replacing it and sealing it to the undamaged other sealed microdischarge unit with its stiffener rods 21 still in place. The stiffener rods, at least some of them, preferably protrude outside the double-sealed twin package, to be used for placement in mating sockets in the cylinder or rectangular chamber.

For military use in the field, a double-package of single sealed microdischarge array units 30*a* and 30*b* (FIG. 13 inset or FIGS. 14-16)) may be preferred without extending stiffener rods, or without any stiffener rods as shown in FIGS. 15-16, where stiffener rod holder 26 serves as separation assurance. The sealed unit may use one or more spiral separators 8 or 9 for separation assurance, or may use one or more chain separators 31. The sealed microdischarge array is simply laid out flat, chain separators are placed flat with appropriate grippers on the surface of the sealed unit in the direction of rolling, and then rolled up with the sealed unit. The separation-assured configuration can then be inserted into the cylindrical housing of the microdischarge array unit 1. Note that all separation assurance devices permit reasonable fluid flow. In most embodiments, fluid flow is maintained unidirectional, by means such as check valves, to prevent self-contamination.

CONCLUSION

The invention has been shown and described with respect to a personal water purifier embodiment. Certain variations have been shown to form in-line and canteen configuration water purifiers. The invention may also be used in other configurations, and in treatment of fluids other than drinking water, without departing from the spirit and scope of the invention, as defined by the following claims.

The invention claimed is:

1. Portable apparatus for water purification, comprising:
 a) a water treatment chamber having water input/output means;
 b) a spirally-wound flexible sealed microdischarge array filled with UV-emissive gas at a pressure in the range 1-2 atmospheres, mounted in said water treatment chamber;
 c) separation assurance means (8, 9) mounting said flexible microdischarge array spiral-wound inside said water treatment chamber to restrict water flow to in-line channels at effective purifying range of such ultraviolet radiation emission from said microdischarge array; and
 d) power means, connected to said microdischarge array, effective to cause emission of ultraviolet radiation for water purification.

2. Portable apparatus for personal water purification, comprising:
 a) a water treatment chamber having water input/output means;
 b) a spirally-wound flexible sealed microdischarge array filled with UV-emissive gas at a pressure in the range 1-2 atmospheres, mounted in said water treatment chamber;
 c) separation assurance means comprising stiffener rods (21) configuring said flexible microdischarge array as wrapped layers of a spiral-wound rectangular scroll (30), arranged loosely at nominal separation inside said water treatment chamber to restrict in-line water flow in channels at effective purifying range of such ultraviolet radiation emission; and
 d) power means, connected to said microdischarge array, effective to cause emission of ultraviolet radiation for water purification.

\* \* \* \* \*